April 4, 1961  G. BOULET  2,977,753
IMPROVEMENTS IN CONTINUOUS FLOW GAS ENGINES
Filed Feb. 9, 1955
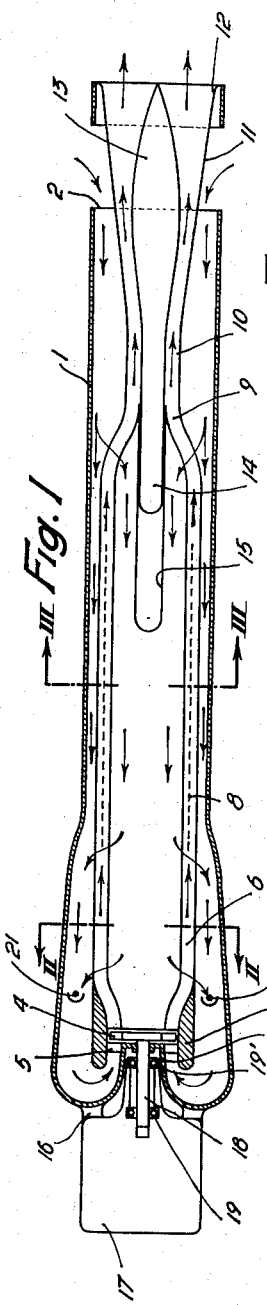
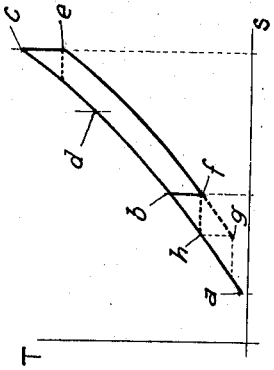
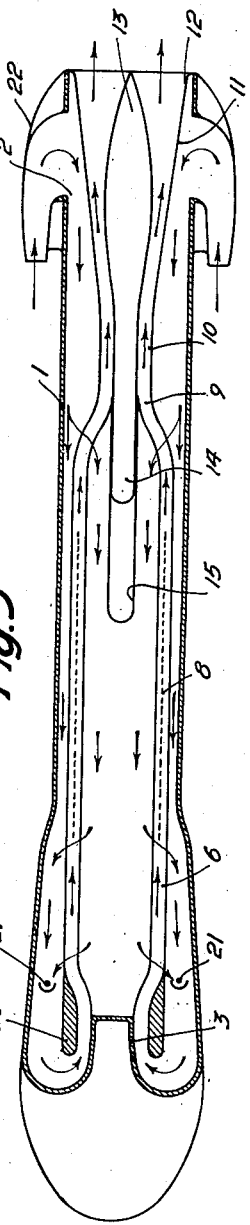
INVENTOR:
GEORGES BOULET
ATTORNEY

United States Patent Office 2,977,753
Patented Apr. 4, 1961

2,977,753

IMPROVEMENTS IN CONTINUOUS FLOW GAS ENGINES

Georges Boulet, Toulouse, France, assignor to Recherches Etudes Production R.E.P., Paris, France, a French company Filed Feb. 9, 1955, Ser. No. 487,129

Claims priority, application France Feb. 13, 1954

3 Claims. (Cl. 60—35.6)

This invention relates to continuous flow gas engines which comprise a pipe open at both ends, in which a flow of gas, in general hot air or gases, circulates, said pipe being provided, on the one hand, with means for varying the pressure of the said gas so that it flows according to a given cycle and, on the other hand, if necessary, with means for heating the said gas, in general by the combustion of a suitable fuel inside the gas.

More particularly the invention relates to engines of said type in which the means provided inside the pipe for varying the pressure of the gas circulating are so arranged that it is after expansion that the fluid undergoes the compression necessary for passing from the low pressure of the cycle to a higher pressure, in a zone where its speed has deliberately been kept at a sufficiently high figure.

When the lower pressure of the cycle is atmospheric pressure, it is possible to work between two isobars without any special means being necessarily provided for the purpose of taking calories from the fluid during its flow along the lower isobar, the said flow taking place in the atmosphere to which the said calories are generally given off. But when the low pressure of the cycle is lower than atmospheric pressure, it is then necessary to provide refrigerating means inside the pipe for the evacuation of the heat given off by the gas during its flow at the said low pressure.

The object of the invention is to provide means which permit of reducing the amount of external heat to be supplied to the gas through a heat exchanger adapted to transmit the calories to given off by the gas upstream of the outlet orifice to the gas circulating downstream of the intake orifice.

With this principal object in view, the invention consists in folding back on itself the flow circuit of the gas, for instance, in constituting the pipe through which said gas passes by a tube or preferably a nest of tubes open at both ends, arranged inside a tube open at one end only, the said nest of tubes being pushed down close to the bottom of the latter tube, in such a way that the said nests of tubes can serve as heat exchanger by cooling the gas which circulates inside them and reheating the gas which circulates outside them.

By way of illustration and in no way restrictively, two specimen embodiments of engines according to the invention are shown in the accompanying drawing. In this drawing:

Fig. 1 is an axial cross-section of a gas turbine according to the invention;

Fig. 2 is a transversal cross-section along the line III—III of Fig. 1;

Fig. 3 is a transversel cross-section along the lines III—III of Fig. 1;

Fig. 4 shows the operating cycle of the machine shown in Figs. 1 to 3, in entropy and temperature coordinates;

Fig. 5 is an axial cross-section of a ram-jet engine also operating according to the cycle shown in Fig. 4.

The gas turbine shown in Figs. 1 to 3 comprises a substantially cylindrical outside casing 1, the wall of which is a good heat insulator. It is normally open at its rear end 2 and curved back inwards at its front end 3 which therefore opens, with a smaller cross-section, into the inside of the outside cylindrical tube formed by the main part of the said casing 1. A turbine wheel 4 is fitted inside the casing 1 in the axis of the orifice 3, guide blades 5 being fixed on the said part 3 of the casing 1. At the outlet of the turbine 4 opens a nest of tubes 6 provided with cooling ribs 7, their axis being parallel with the axis of the turbine 4 and the casing 1; this nest is substantially cylindrical and co-axial with the said casing 1.

Beginning at a certain distance from the turbine 4 and over a part of their length, the tubes 6 are connected externally by intermediate partitions 8 intended to divide the air flow between the zones to be cooled inside and outside the tubes 6. As seen on Fig. 1, the partitions 8, shown by dotted lines on said figure, are provided so as to connect the tubes 6 only in their middle part, and to let free spaces between them at their rear or inlet part for the inlet air entering through 2 to pass within the circles of tubes 6. At the front part of the tubes 6 no connecting partitions 8 are any more provided and the air within the circle of tubes 6 passes to the front space of casing 1. At their front end 9 these tubes 6 open into the narrowest and substantially cylindrical part 10 of a conical diffuser 11, the outlet orifice 12 of which is of a diameter corresponding to a low outward flow. Inside this diffuser 11 is fitted an adjustment spindle 13 of which the tail 14 can slide in a groove 15 and of which the movements are controlled by any suitable means (not shown in the figure) which is known in itself.

On the front curved-back of the casing 1 is fixed, by lugs 16, a housing 17 containing, for example, the speed reducing components of the turbine and the controls of auxiliary parts. These components are driven through the shaft 18 carried on the bearings 19, 19' of the housing 17. A substantially cylindrical, thick-walled division 20, which can be heat insulated if necessary, delimitates internally the flow pipe of the gas at the front part of the casing 1, and burners 21 are fitted in the said pipe upstream of the turbine 4 in zones which constitute the combustion chambers of the machine.

The engine which has just been described works as follows:

A flow of feed air coming from the atmosphere penetrates into the casing 1 by the rear orifice 2 and circulates at first at atmospheric pressure in the pipe delimitated by the inside wall of the casing 1 and the outside wall of the diffuser 11 in its rear part, and simply by the casing 1 in its front part. The cross-section of this part of the flow pipe varies so that the speed of the air, which is low, remains constant until after the zone of the burners 21 has been passed. During this travel, which corresponds to the upper isobar $a$, $b$, $c$ of the cycle shown in Fig. 4, the air is heated first by contact with the tubes 6 of the heat exchanger, in which the combustion products circulate after passing through the turbine 4, and then, from $d$ onwards, by the combustion of the fuel injected into the said burners 21. From the zone situated a little behind the burners 21 onwards the cross-section of the pipe through which the gas flows and which is delimitated by the casing 1 and the wall of the division 20, decreases so as to cause the gas to expand down to a pressure below that of the atmosphere and corresponding to a speed which, measured in Mach number, is in general in the neighborhood of or less than 1.1, which is very suitable for use in a turbine. This is the part $c$, $e$ of the cycle (Fig. 4).

The gas then passes through the guide blades 5 and the turbine wheel 4 where it loses some of its speed and therefore of its energy. It next passes through the tubes 6 of the cooler at a pressure and speed which should, if possible, be constant. Here its temperature is lowered and the heat given off by it is transmitted to the gas which is reaching atmospheric pressure outside the said tubes 6. The isobar $e, f$ of the cycle (Fig. 4) is thus travelled over.

On coming out of the tubes 6 of the cooler the gas penetrates into the diffuser 11 where it is slowed down; its pressure therefore rises and again reaches the original atmospheric pressure. This phase corresponds to the $f, b$ part of the cycle (Fig. 4). By a translation movement of the spindle 13 it is possible to regulate compression, the said movement causing the cross-sections of the passage in the diffuser to vary as desired.

In the specimen embodiment shown in Fig. 5, the machine according to the invention is a ram-jet engine constituted in the same manner as the turbine shown in Fig. 1 and working according to the same cycle.

The same components as previously, bearing the same reference numbers, will be found here, with the exception of the turbine 4 and its guide blades 5, which are done away with. On the contrary, it comprises an air intake diffuser 22 which, when the ram-jet is displaced, ensures preliminary static compression before entry into the pipe 1.

The speed of flow in the tubes 6 is the same as that at the entry into the turbine 4 in the turbine engine. After compression in the diffuser 11 the remaining speed of the gas supplies the thrust.

It follows that such a jet engine, which can thus function without the air admitted having to undergo any compression upstream of the combustion chambers, can give a thrust even at the fixed point.

What I claim is:

1. A continuous flow gas engine having a flow channel comprising a first portion for the continuous admission of gas at a first pressure, an expansion portion downstream of said first portion for continuously expanding the gas to a second pressure lower than the first pressure, a second portion downstream of said expansion portion in heat exchange relation to said first portion for continuously transferring heat from the gas in said second portion to the gas in said first portion, a combustion zone intermediate said first and second portions for continuously raising the temperature of the flowing gas, and a diffuser portion downstream of said second portion for continuously raising the pressure of the flowing gas from said second pressure to said first pressure.

2. An engine as claimed in claim 1, wherein said first pressure is atmospheric pressure, wherein said first portion of said channel is in the form of a large tube having an open inlet end and a closed end, and wherein said second portion of said channel is in the form of a plurality of open ended small tubes disposed within and extending generally parallel to said large tube.

3. An engine as claimed in claim 2, wherein all of said small tubes communicate with a single outlet diffuser forming the diffuser portion of said channel.

References Cited in the file of this patent

UNITED STATES PATENTS

| 868,397 | Bergmans | Oct. 15, 1907 |
| 891,901 | Davies | June 30, 1908 |
| 2,570,629 | Anxionnaz | Oct. 9, 1951 |
| 2,623,356 | Coanda | Dec. 30, 1952 |
| 2,668,413 | Giliberty | Feb. 9, 1954 |
| 2,795,104 | Zinner | June 11, 1957 |

FOREIGN PATENTS

| 951,942 | France | Apr. 25, 1949 |
| 920,205 | Germany | Nov. 15, 1954 |
| 118,650 | Great Britain | Sept. 12, 1918 |
| 387,264 | Great Britain | Feb. 2, 1933 |
| 439,805 | Great Britain | Dec. 6, 1935 |